United States Patent [19]

Mackaness et al.

[11] 3,946,676
[45] Mar. 30, 1976

[54] SELF CENTERING BOGIE

[76] Inventors: James B. Mackaness, 28 The Crescent, Cheltenham, New South Wales, Australia; Edward Poitras, 198 Highland St., Holliston, Mass. 01746

[22] Filed: July 5, 1973

[21] Appl. No.: 376,816

[30] Foreign Application Priority Data
July 4, 1972  Australia.............................. 9567/72

[52] U.S. Cl............. 105/169; 105/180; 105/182 R; 105/199 C; 105/206 R; 105/208; 105/218 A; 105/224 R; 308/137
[51] Int. Cl.².... B61F 3/08; B61F 5/04; B61F 5/18; B61F 5/56
[58] Field of Search.... 105/180, 182 R, 179, 206 R, 105/194, 199 R, 199 C, 218 A, 169, 208, 224; 308/137

[56] References Cited
UNITED STATES PATENTS

| | | | |
|---|---|---|---|
| 139,063 | 5/1873 | Jenks .............................. | 105/199 R |
| 789,511 | 5/1905 | Voss ................................ | 105/194 |
| 1,191,136 | 7/1916 | Muhlfeld et al.............. | 105/206 R X |
| 1,576,298 | 3/1926 | Barbey et al........................ | 105/179 |
| 1,712,747 | 5/1929 | Clasen .............................. | 105/180 |
| 1,962,893 | 6/1934 | Christianson ................... | 105/182 R |
| 2,056,221 | 10/1936 | Wright et al........................ | 308/137 |
| 2,473,714 | 6/1949 | Krotz .............................. | 105/182 R |
| 2,545,956 | 3/1951 | Julien.............................. | 105/182 R |
| 2,620,742 | 12/1952 | Watter................................ | 105/180 |
| 3,762,337 | 10/1973 | McKeon et al. ............ | 105/199 C X |

*Primary Examiner*—Robert J. Spar
*Assistant Examiner*—Howard Beltran

[57] ABSTRACT

A bogie having a bolster comprising a center pin support, and elongated support member mounted in center pin support, cam means on the center pin support to co-act with complementary cam means on a wagon to bias the support member to a position transverse to the rail track; two parallel side frames mounted on the respective ends of the support member and lying parallel to the rail track, four wheel supporting arms located one below each end of the side frames, two wheel arm supports one on either side of the support member on each of which is pivotally mounted two of said wheel supporting arms, two downwardly divergent pivotal connections respectively connecting each wheel arm support to the center pin support to bias the wheel supporting arms to a position parallel to the rail track, springs between overlying portions of the side frames and the wheel supporting arms and a wheel rotatably mounted on each wheel supporting arm.

13 Claims, 7 Drawing Figures

SELF CENTERING BOGIE

This invention relates to bogies as used on railway rolling stock of the motorised or trailing type, all of which are commonly referred to as cars.

As presently constructed, most bogies comprise side frames and several pairs of wheels, the wheels of each pair being connected by an axle rotatably mounted in bearings supported on the side frames. Usually there is a resilient interconnection between the wheel pairs and the side frames to permit up and down movement therebetween.

The periphery of each wheel is referred to as a tire and it is usually angled relative to the plane of the wheels so that the diameter of the wheel to the inner edge of the rail is larger than the diameter to the outer edge of the wheel. Additionally, the wheel is flanged around its larger diameter. The theoretical reason for the tire angle is to compensate for the distance differential between the inside and the outside edges of the rails on curves. Such tire configurations, however, lead to high unit loads, tire surface scrubbing on straight track and yaw oscillation. The general bogie construction also makes it difficult to remove wheels for servicing, and because the axles must be of heavy section, the bogie ride is poor. In addition to this the construction is complex and expensive. For all of the foregoing reasons such bogies have long been considered as something less than the perfect way to support a carriage or van on railway tracks.

The present invention provides a bogie of simple construction and comprises four wheels individually rotatably supported at the respective ends of arm assemblies. The wheels are transversely spaced apart to suit the rail gauge and include flanges on their inner edges.

The invention will be described with reference to the drawings in which.

Figure 1:
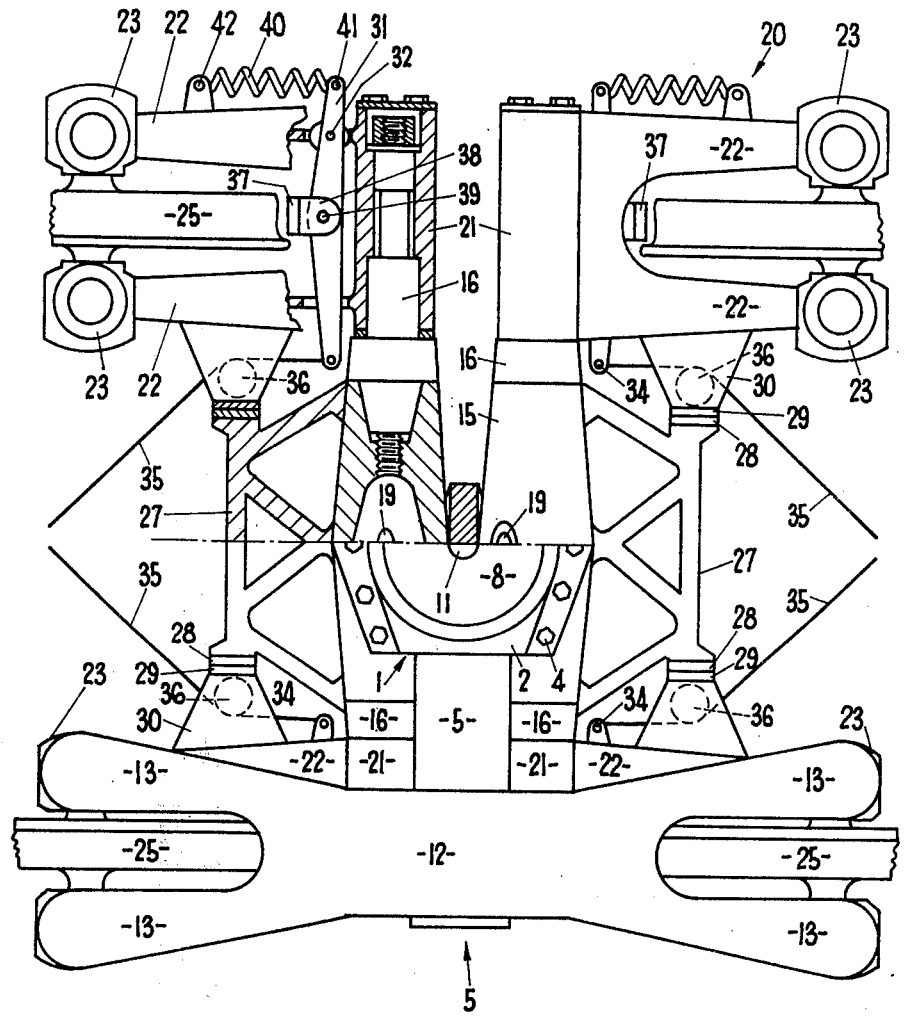
FIG. 1 is a partly sectioned plan view of one form of the bogie of this invention.
Figure 2:
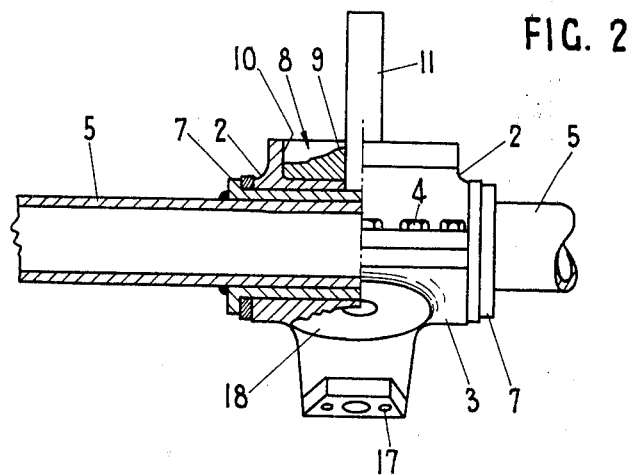
FIG. 2 is a partly sectioned and fragmentary view of the transverse support member and centre pin assembly of the embodiment of FIG. 1.
Figure 4:
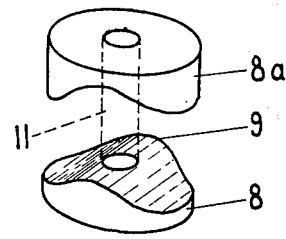
FIG. 4 is a perspective view of component parts of a self-centering device as used in the embodiment of the bogie illustrated in FIG. 1.

Referring to the drawings FIGS. 1 to 4, the bogie comprises a centre pin assembly 1 made up of an upper and lower part 2 and 3 bolted together as at 4 and internally shaped to act as a bearing for a tubular sleeve 6 fixed to a transverse support member 5. The sleeve 6 has shoulders 7 to axially locate the assembly 1.

The center pin assembly 1 and the member 5 constitute a bolster assembly with upper part 2 including a self-centering arrangement on its upper face made up of a circular support plate 8 having a diametric ridge 9. The plate 8 is housed in a circular recess 10 in assembly part and prevented from rotating. Mounted in the recess 10 is an upstanding center pin 11 which passes centrally through the plate 8 and the ridge 9. The ridge 9 and the upper surface of plate 8 combine with a groove in a like plate on the underface of a rail car to be supported on the bogie with the post 11 in engagement with a hole in the said like plate. It follows that rotation movement of the bogie about the post 11 causes the ridge to be misaligned with the groove and a tendancy for the rail car to be lifted. The weight of the rail car counters this tendancy and hence the member 5 is urged back to its normal location, transverse to the rail track.

To each end of the member 5 there is fixed a side frame 12 which extends in general alignment with the rail track to both sides of the member 5. Each end of frame 12 is bifurcated to provide legs 13 and an upper spring housing 14 is located at the end of each leg 13. A wheel arm support 15 is mounted on the center pin assembly on each side of the member 5.

Extending parallel to the member 5 from each end of each wheel arm support member 15 is a pivot pin 16. The members 15 are pivotally mounted in generally U shaped sockets provided by lugs 17 and faces 18 on the pivot assembly part 3. Pivot pins 19 angled to the vertical in the direction of the rail track connect the members 15 to the sockets. The angled pins 19 provide means for achieving a self-centering biasing action for the arms supporting the wheels. This could also be achieved by means of upright pins 19 and co-operating members similar to those identified 8 and 8a as provided in the centre pin assembly and on the carriage to be supported respectively. Pivotally mounted on each pivot pin 16, which is preferably removable for servicing, is a lower side arm assembly 20 comprised of a sleeve 21 with a pair of arms 22 extending below the upper side arm 12 and each terminating in a lower spring housing and bearing unit 23. The bias spring housing and bearing units 23 are respectively located below the spring housing 14. Springs 24 are located in and extend between the overlying items 14 and 23.

Wheels 25 on the stub axles 26 are supported one between each pair of units 23.

Lateral spacing of the wheels is ensured by means of a skeletal frame 27 fixed to the support member 15 terminating in rubbing surfaces 28 which are in rubbing contact with rubbing surfaces 29 on bosses 30 fixed to the arms 22.

The braking of the wheels 25 is effected by means of brake levers 31 pivotally mounted as at 32 on the outer arms 22 and passing through openings 33 in the inner arms 22. The ends 34 of the levers 31 are connected in pairs by cables 35 which pass around pulleys 36 in the bosses 30. Brake pads 37 are mounted on brake shoes 38 pivotally supported as at 39 on the levers 31 and are spring biased to "off" position by springs 40 linking the ends 41 of the arms 31 to lugs 42 on the arms 22.

In this form of the invention the load distribution due to the carriage weight is from the center pin assembly 1 to the transverse support member 5 and then indirectly to the wheels 25 supported on the arms 22 through the springs 24.

The foregoing embodiment has described the component parts 27, 28 and 29, these being provided to ensure lateral wheel spacing. It would be possible to construct a bogie in accordance with the general concept of the invention without the components 27, 28 and 29. In order that this should be accomplished the other components e.g. the pivot pins 16 and the side frames and the wheel arms would have to be made of much heavier section to resist the forces which tend to laterally displace the wheels and which in the illustrated embodiment are resisted by the members 27, 28 and 29.

Figure 5:
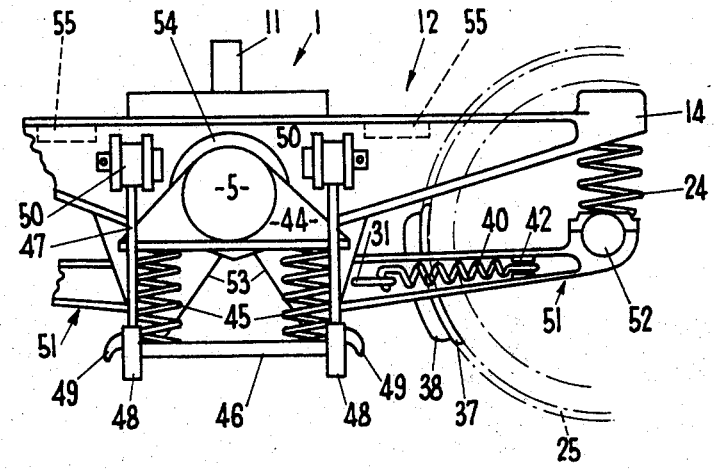
FIG. 5 is a fragmentary view of a second form of the bogie of this invention.
Figure 6:
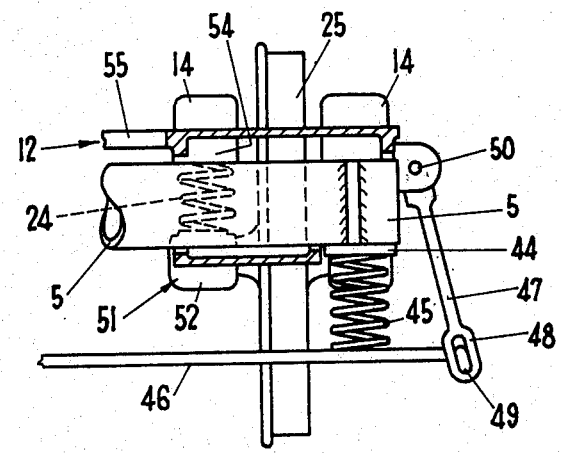
FIG. 6 is a partly sectioned and fragmentary view of the form of the bogie illustrated in FIG. 5.

In another embodiment (see FIGS. 5 and 6) the load distribution due to the carriage weight is from the center pin assembly 1 to the transverse support member 5 to spring support brackets 44 fixed to the ends of the member 5. Springs 45 transfer the load to a swing hanger arrangement comprising, a transom 46 supported by downwardly divergent swing links 47 having at their lower ends sockets 48 in which hooks 49 of the transom engage. The upper ends of the swing links are pivotally connected to the side frames 12 as at 50. The load is transferred indirectly to the wheels 25 by the springs 24 which are disposed between lower arm assemblies 51 having wheel supporting bearing means 52. Each arm assembly 51 comprises a pair of arms which are pivotally connected to brackets 53 on the upper side arms 12. In order to provide required lateral wheel movement the member 5 passes through a clearance hole 54 in each side frame 12.

The side frames 12 are joined by cross stays 55 to provide lateral stability in side frames.

In this embodiment (but for convenience not illustrated in full detail) there would be provided a brake assembly as provided in the first form of the invention and comprising levers 31 pivotally mounted and spring biased by springs 40 and having brake shoes 37–38 operated by cables 35 running over pulleys 36 mounted in bosses 30 on the wheel arms.

Figure 7:
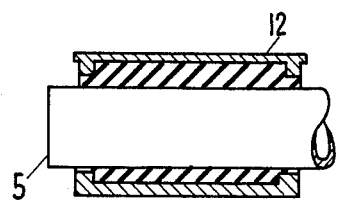
FIG. 7 is a fragmentary view of a form of connection between the upper side arm and the transverse support member of a third form of the bogie of this invention.
Figure 3:
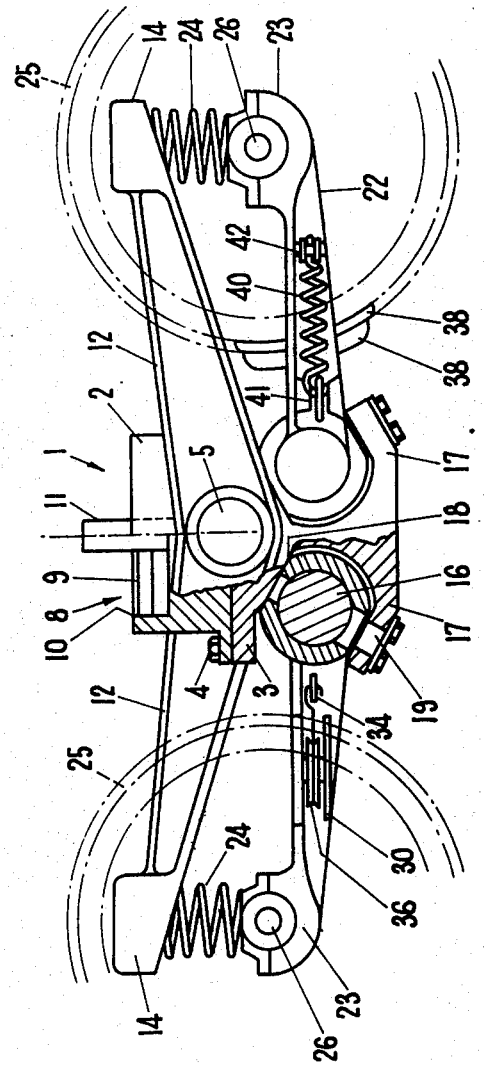
FIG. 3 is a partly sectioned and fragmentary side view of the embodiment of FIG. 1.

It would also be possible to achieve the characteristics of the foregoing transom and link arrangement by dispensing with the transom supports 44, the spring 46, the swing links 47 and the springs 45 and mounting each end of the transverse support member 5 in each side frame 12 on a bearing bush of resilient material mounted in bush housings in each side frame 12. This form of the invention is as illustrated in FIG. 7.

In a conventional manner, shock absorbers for the springs and an elastic connection between the bolster and the car can be employed to damp spring oscillations and yaw oscillation of the bolster.

It has been found that the foregoing constructions provide good riding characteristics and a bogie which is simple and economical to make. The handling of the bogie is enhanced by making the surfaces of the wheel tires cylindrical. It is desirable however, to cater for some track conditions, to have profiled or angled tire peripheries.

The manner of mounting the wheels facilitates their removal in a generally horizontal direction, whereas previously it was necessary to raise the car so that vertical removal could be effected.

We claim:

1. A bogie comprising a center bearing, an elongated bolster supporting said center bearing, cam means on said center bearing to co-act with complementary cam means on a wagon to bias said bolster to a position transverse to a rail track; two parallel side frames mounted on the respective ends of said bolster and lying parallel to the rail track, four wheel supporting arms located one below each end of said side frames, two wheel arm supports one on either side of said bolster on each of which is pivotally mounted two of said wheel supporting arms, two pivotal connections respectively connecting each wheel arm support to said bolster, bias means biasing the wheel supporting arms to a position parallel to the rail track, springs exerting a bias force between said side frames and said wheel supporting arms, and a wheel rotatably mounted by stub axles on each wheel supporting arm.

2. A bogie comprising:
   a bolster adapted to extend transversely between a pair of rail tracks;
   center support means mounted on said bolster and adapted to support a wagon;
   a pair of wheel arm supports adapted to extend transversely between the rails and both pivotally connected to said bolster one to either side thereof for pivotal movement laterally of the rails;
   four wheel arms each connected for independent vertical pivotal movement one to each end of each of said wheel arm supports, said wheel arms at adjacent ends of said wheel arm supports extending in opposite directions;
   a track engaging wheel means mounted by stub axles on each of said wheel arms, each of said wheel means being mounted for rotation independently of each other wheel means;
   first bias means exerting a downward bias on each of said wheel arms; and
   second bias means biasing said wheel arm support means in a position perpendicular to the rails.

3. A bogie according to claim 2 wherein said second bias means comprises pivot pin means connecting said wheel arm support means to said bolster, said pivot pin means extending acutely from the vertical.

4. A bogie according to claim 3 wherein said bolster comprises two U-shaped sockets on opposite sides thereof, and said wheel arm support means are pivotally housed in said U-shaped sockets by said pivot pin means.

5. A bogie according to claim 2 wherein said center support comprises cam means for engaging the wagon so as to bias said bolster in a position transverse to the track.

6. A bogie according to claim 2 including upright bearing surfaces on each wheel supporting arm, the bearing surfaces of each pair of wheel supporting arms engaging each other to maintain the wheels on each pair of arms at the correct distance apart.

7. A bogie according to claim 2 including two parallel side frames mounted on the respective ends of said bolster and lying parallel to and above said wheel arms.

8. A bogie according to claim 7 including a fixed connection between said bolster and said center support means, and connections between said bolster and said side frames permitting pivotal movement of said side frames relative to each other and said bolster.

9. A bogie according to claim 7 including a fixed connection between each said side frame and said bolster and a pivotal connection between said bolster and said center pin support means.

10. A bogie according to claim 7 wherein said side frames and said wheel supporting arms are bifurcated for part of their length to accept mounting of said wheel means in wheel bearing means on each leg of each bifurcated wheel supporting arm.

11. A bolster according to claim 2 wherein each of said wheel arms is bifurcated providing legs that straddle said wheel mounted thereon.

12. A bolster according to claim 11 wherein said first bias means comprises a pair of side frames one mounted on each end of said bolster and lying parallel to the rail tracks, and spring members exerting a bias between said side frames and said wheel arms.

13. A bolster according to claim 12 wherein each of said side frames is bifurcated at each end providing legs that straddle each of said wheels.

* * * * *